United States Patent
Psutka et al.

(10) Patent No.: US 9,540,185 B2
(45) Date of Patent: Jan. 10, 2017

(54) RACK STOPPER SYSTEM

(75) Inventors: John Psutka, Breslau (CA); Mike Ellis, Kitchener (CA); Todd Jason Hughes, Guelph (CA)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 397 days.

(21) Appl. No.: 13/168,165

(22) Filed: Jun. 24, 2011

(65) Prior Publication Data

US 2012/0328407 A1    Dec. 27, 2012

(51) Int. Cl.
*B65G 1/00* (2006.01)
*B65G 47/57* (2006.01)
*B65G 41/00* (2006.01)

(52) U.S. Cl.
CPC ............ *B65G 47/57* (2013.01); *B65G 41/008* (2013.01)

(58) Field of Classification Search
CPC ...................................... B65B 1/08
USPC ............................ 414/276, 267, 269, 331.08
See application file for complete search history.

(56) References Cited

U.S. PATENT DOCUMENTS

| | | | |
|---|---|---|---|
| 2,296,683 A * | 9/1942 | Morgan | B21C 47/24 198/463.6 |
| 5,139,102 A | 8/1992 | Pocapalia | |
| 6,334,252 B1 | 1/2002 | Sato et al. | |
| 6,468,015 B1 * | 10/2002 | Konstant | 414/276 |
| 2010/0301538 A1 | 12/2010 | Turner et al. | |

* cited by examiner

*Primary Examiner* — Saul Rodriguez
*Assistant Examiner* — Willie Berry, Jr.
(74) *Attorney, Agent, or Firm* — Dinsmore & Shohl LLP

(57) ABSTRACT

The present invention provides a rack stopper system for holding a plurality of components and/or component trays on a rack and then allowing the component trays to be transferred to another rack. The system can include a base, a support bar attached to the base, and a wiper bar pivotally attached to the support bar. The wiper bar can have a stop position that blocks a component and/or a component tray from rolling off of a first rack and a pass position that allows the component and/or component tray to roll off of the first rack and onto a second rack.

8 Claims, 6 Drawing Sheets

RACK STOPPER SYSTEM

FIELD OF THE INVENTION

The present invention is related to a system for stopping the movement of a component and/or a component tray along a conveyor rack, and in particular, to a rack stopper system that allows a component and/or a component tray to be transferred from one rack to another rack using one or more wiper bars.

BACKGROUND OF THE INVENTION

The use of racks to store and/or transfer components, parts, etc. is known. In addition, racks having a plurality of rollers such that components and/or component trays can be moved from one location to another location are also known. Such racks can move the components and/or component trays along the plurality of rollers through the use of gravity, mechanized rollers, and the like.

In some instances, a dolly can be used and loaded with components and/or component trays at a first location and then rolled to a desired second location where the components and/or component trays are unloaded from the dolly. For example and for illustrative purposes only, the dolly can be used to receive components and/or component trays from a first rack at the first location and then rolled to the second location where the components and/or trays are transferred onto a second rack.

It is appreciated that as the first set of components and/or component trays are moved from the first location to the second location, that a second set of components and/or component trays can be placed on the first rack and be available for loading onto the dolly when it returns to the first location. In this manner, components can be supplied to an assembly line in a continuous and time-efficient manner. It is also appreciated that the components and/or component trays must be held at a desired position or location on the first rack, the dolly, and/or the second rack until desired unloading and/or loading can take place. As such, the first rack, the dolly, and/or the second rack can include a stopper system that prevents the components and/or component trays from moving beyond a specified point thereon.

Heretofore stopper systems have typically used mechanical lever mechanisms to move a stopper arm from a stop position that prevents the components and/or component trays from passing thereby to a pass position that allows the components and/or component trays to pass thereby, and vice versa. Such mechanical mechanisms generally require metal-to-metal contact between, for example, a dolly and a first rack or a dolly and a second rack. In addition, such types of stopper systems require sufficient physical force in order to move the stopper arm between the stop and pass positions and this force can result in significant wear of the stopper system components and/or jostling of the components and/or component trays on the dolly, first, rack, second rack, etc. As such, an improved stopper system that overcomes the problems of heretofor stopper systems and affords for components and/or component trays to be transferred from a first rack to a dolly and/or from a dolly to a second rack would be desirable.

SUMMARY OF THE INVENTION

The present invention provides a rack stopper system for holding a plurality of components and/or component trays on a rack and then allowing the components and/or component trays to be transferred to another rack. The system can include a first rack and a second rack, the first rack having an unload end and the second rack having a load end. The first rack unload end and the second rack load end can have a generally equal height and are operable for a component and/or a component tray to roll off of the first rack and onto the second rack. In addition, the first rack can be inclined with a downward slope towards the unload end, the downward slope affording for gravity to assist in the transfer of the component and/or component tray from the first rack to the second rack.

The first rack unload end can have a base, a support bar attached to the base, and a wiper bar pivotally attached to the support bar. The wiper bar can have a stop position that blocks a component and/or a component tray from rolling off of the first rack unload end and a pass position that allows the component and/or component tray to roll off of the first rack unload end. The second rack load end can include a lift plate, the lift plate having a down position that engages the wiper bar when it is in the stop position and an up position that pivots the wiper barto the pass position.

The wiper bar can be biased to the stop position, for example be biased via gravity to the stop position. In addition, the wiper bar can have a stop end and a plate end, the plate end having a bearing attached thereto such that the lift plate engages the bearing when pivoting the wiper bar from the stop position to the pass position. The plate end can also have a stop member extending from the wiper bar in a direction towards the support plate such that the stop member engages the support bar and holds the wiper bar at an angle relative to vertical when in the stop position.

A process for transferring components and/or component trays from a first rack to a second rack is also included. The process includes providing a first rack with an unload end, a second rack with a load end, and a plurality of components and/or component trays located on the first rack. In addition, each rack can have a plurality of rollers that afford for the components and/or component trays to roll thereon. The process further includes providing a base attached to the first rack unload end, a support bar attached to the base, and a wiper bar pivotally attached to the support bar. The wiper bar is operable to pivot between a stop position that blocks a component and/or a component tray from rolling off of the unload end and a pass position that allows the component and/or component tray to roll off of the unload end. The wiper bar is biased into the stop position and thus blocks the plurality of components and/or component trays from rolling off of the unload end unless moved or pivoted to the pass position.

A lift plate attached to the second rack load end is provided and has a down position and an up position. In addition, the lift plate is operable to engage and move the wiper bar from the stop position to the pass position.

The first rack with the plurality of components and/or component trays is moved into alignment with the second rack until the first rack unload end is adjacent to and aligned with the second rack load end and the lift plate is engaged with the wiper bar. The lift plate is then activated, activation of the lift plate resulting in moving of the plate from the down position to the up position and thereby pivoting the wiper bar from the stop position to the pass position. Thereafter, the plurality of components and/or component trays roll past the wiper bar, off of the first rack and onto the second rack. In some instances, the first rack can be a dolly having casters that allow the dolly to be rolled along a floor and moved into alignment with the second rack.

BRIEF DESCRIPTION OF THE DRAWINGS

FIG. 2 is a top view of the dolly approaching the rack shown in FIG. 1 a;

FIG. 3 is a perspective view of a component and/or a component tray approaching a stopper system on the first rack as illustrated FIG. 1a;

DETAILED DESCRIPTION OF THE PRESENT INVENTION

The present invention provides a stopper system that allows and prevents a component and/or a component tray from passing beyond a specified point along a rack transfer system. As such, the present invention has utility as a component, machine, device, and the like used within an assembly line facility. For the purposes of the present invention, the terms component and component tray are used interchangeably.

The rack stopper system affords for a plurality of components and/or component trays to be held on a first rack while the rack is moved from a first location to a second location and then affords for the components and/or component trays to be transferred from the first rack to a second rack. The system includes at least one wiper bar that is biased in a stop position, the stop position blocking or preventing a component from passing thereby. The wiper bar can be pivoted to a pass position which then allows the component to pass thereby. The wiper bar can be attached to an unload end of the first rack and thus prevent a string or plurality of components being held on the first rack from passing thereby and falling off of the rack. A lift plate that engages the wiper bar and moves it from the stop position to the pass position can be included and be attached to a load end of the second rack. Naturally, the unload end of the first rack is adjacent to and aligned with the load end of the second rack before the lift plate engages the wiper bar and moves the wiper bar from the stop position to the pass position.

Figure 1:
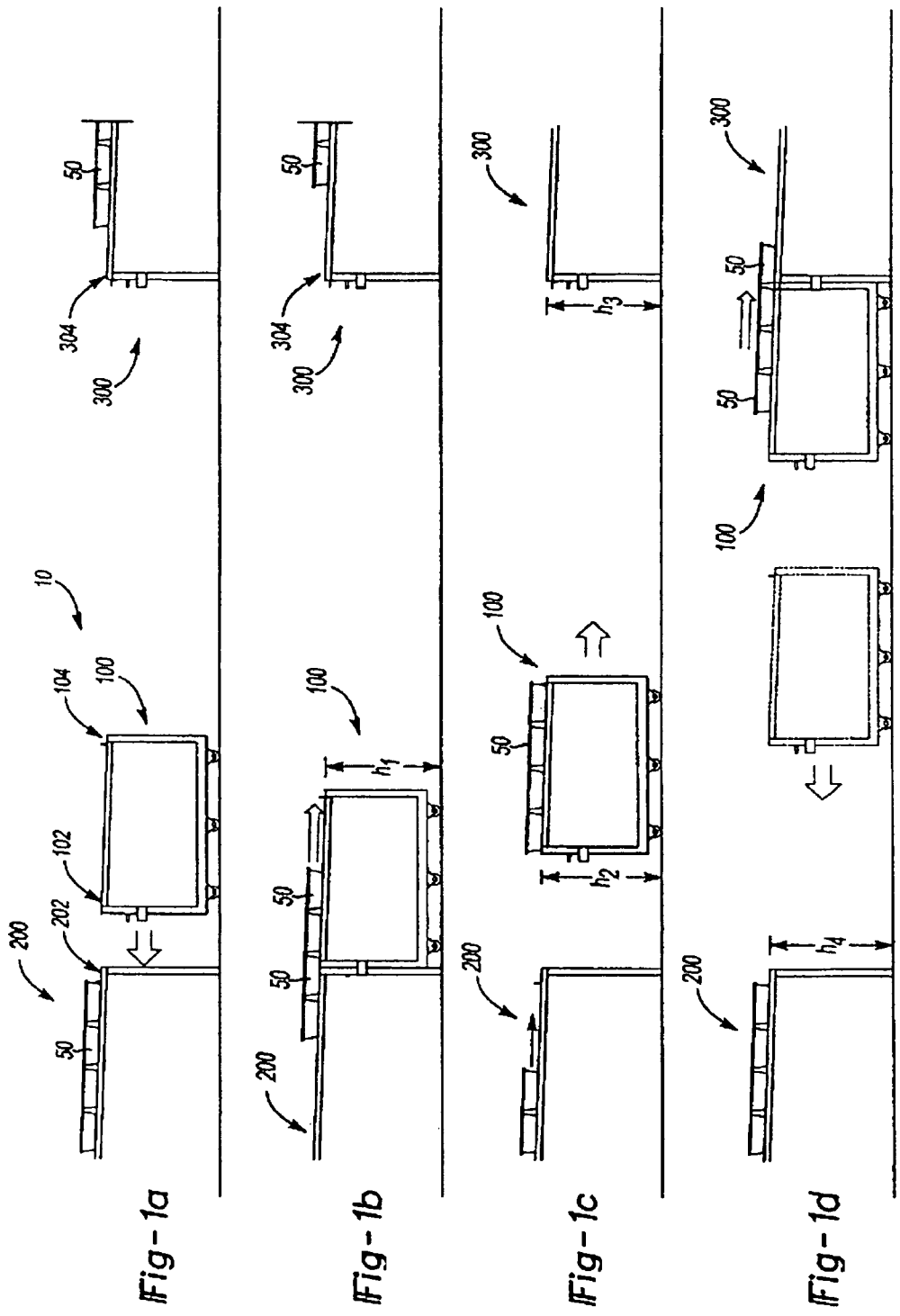
FIG. 1 is a schematic illustration of a dolly receiving components and/or component trays from a first rack at a first location, rolling to a second location, and delivering the components and/or component trays to a second rack.

Turning now to FIG. 1, a rack stopper system 10 according to an embodiment of the present invention in operation is shown in operation. The stopper system 10 can include a first rack 100, a second rack 200, and a third rack 300. It is appreciated that for the purposes of the present invention, the terms first rack 100 and dolly 100 are used interchangeable and the second rack 200 can be a loading rack while the third rack 300 can be an unloading rack. In the alternative, the unloading rack 300 on the right-hand side of the figure can be a second rack.

The first rack 100 can include a load end 102 and an unload end 104. In addition, the second rack 200 can include an unload end 202 with a height $h_4$ that is generally equal to a height $h_2$ of the load end 102.

One or more components 50 can be located on the second rack 200, the rack 200 operable for the components 50 to slide or roll thereon. In addition, the first rack 100 affords for the components to slide or roll thereon and the first rack 100 can be moved adjacent to and in alignment with the second rack 200 and thereby afford for the components 50 to be transferred from the second rack 200 onto the first rack 100.

After the components 50 have been loaded onto the first 100, the first 100 can be moved away from the second rack 200 until it is adjacent to and in alignment with the third rack 300. After proper alignment has occurred, the components 50 can be transferred from the unload end 104 of the first rack 100 to a load end 304 of the third rack 300 and thus provide for a plurality of components 50 to moved from a first location to a second location. It is appreciated that the unload end 104 of the dolly 100 can have a height $h_1$ that is generally equal to a height $h_3$ of the third rack 300 load end 304.

Figure 2:
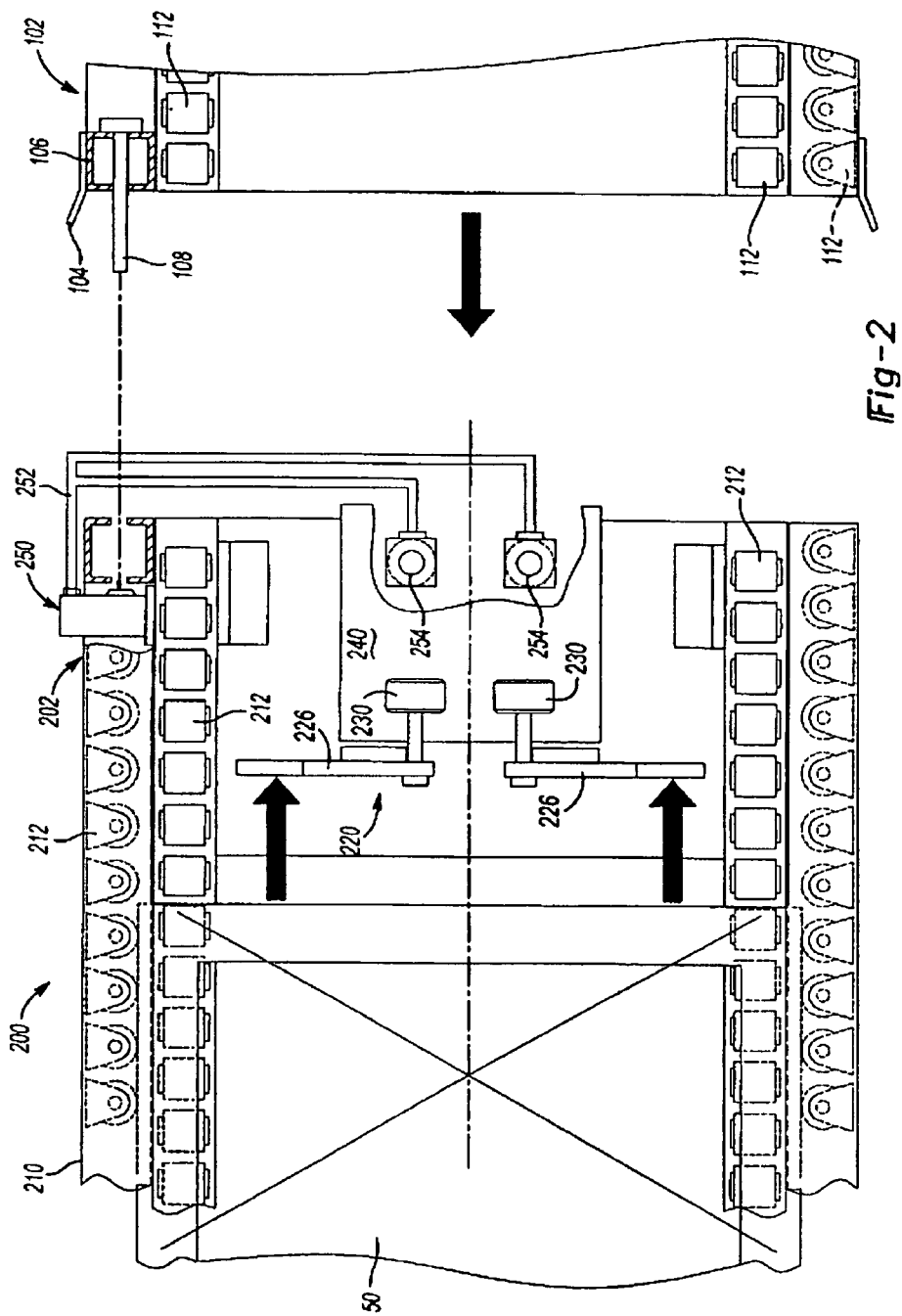
Figure 3:
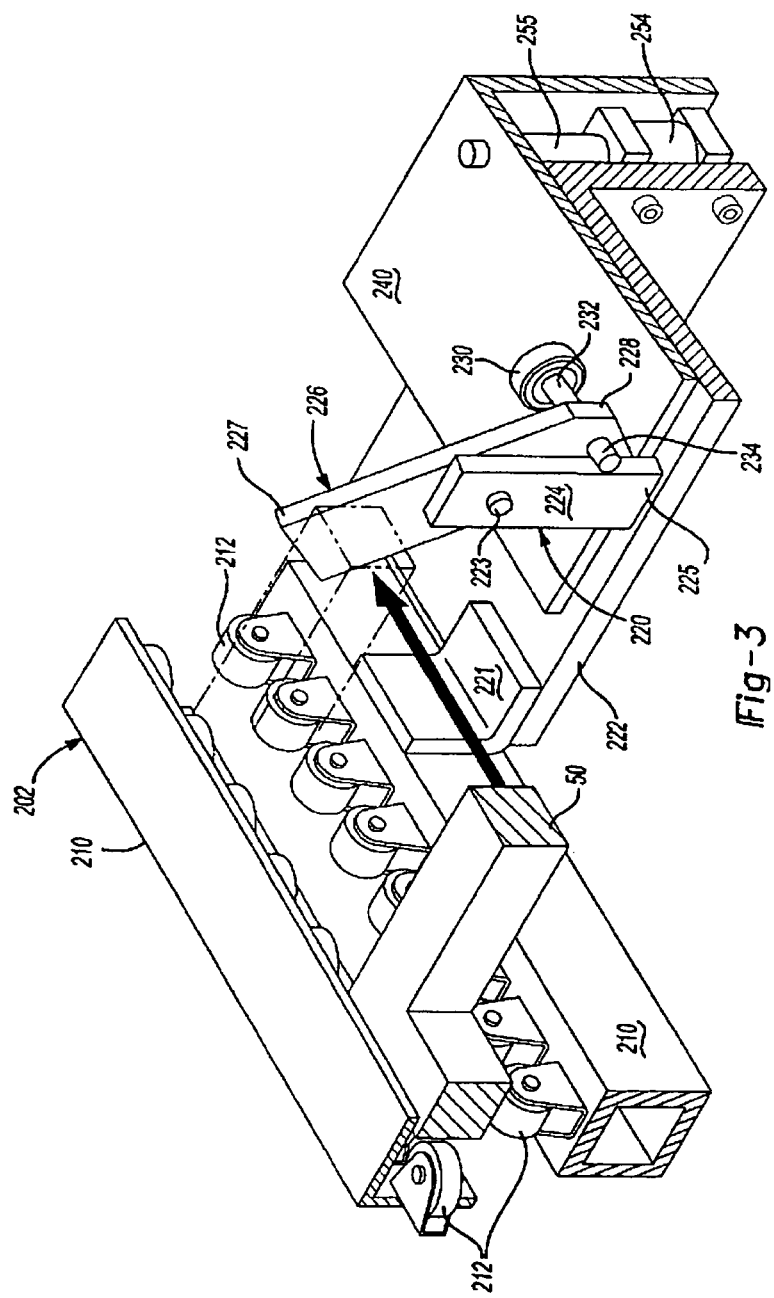

Referring now to FIGS. 2 and 3, the first rack 200 can include a frame 210 and one or more rollers 212 that afford for the component(s) 50 to roll thereon. In addition, a rack stopper system 220 located at the unload end 202 of the first rack 200 can be provided with a component 50 moving in a direction towards the stopper system 220 until coming into contact therewith.

The stopper system 220 can include can include a base 222 that is attached to the frame 210, for example through the use of a bracket 221. It is appreciated that the bracket 221 is not necessarily required and the base 222 can be attached to the frame 220 through the use of welding, fasteners, and the like. The system 220 can also include a support bar 224 having a support end 225 rigidly attached to the base 222 and a wiper bar 226 can be pivotally attached to the support bar 224, for example through a pivot axis 223. It is appreciated that the wiper bar 226 can be located on either side of the support 224 as illustrated by one embodiment in FIG. 2 and another embodiment in FIG. 3. It is further appreciated that the stopper system 220 can include more than one wiper bar 226 as shown in FIG. 2.

The wiper bar 226 can have a stop end 227 and a plate end 228. The wiper bar 226 and the stop end 227 can be in a stop position with stop end 227 being elevated and located such it prevents the component 50 from passing thereby. In addition, the plate end 228 can include a stop or member 234 that prevents the wiper bar 226 from pivoting or rotating into a vertical orientation. Stated differently, the stop 234 can hold the wiper bar 226 at an angle relative to vertical when the bar 226 is in the stop position. In some instances, the wiper bar 226 can be biased into the stop position, for example through the use of gravity, springs, magnets and the like.

Engaged with the plate end 228 can be a lift plate 240. The lift plate 240 can be attached to a cylinder and piston unit 254/255 which affords for the lift plate 240 to move in an up and down direction as shown by the double-headed arrow 20 in FIG. 4. It is appreciated that the cylinder and piston unit 254/255 can be pneumatic, hydraulic, mechanical; and/or electromagnetic in nature.

Figure 4:
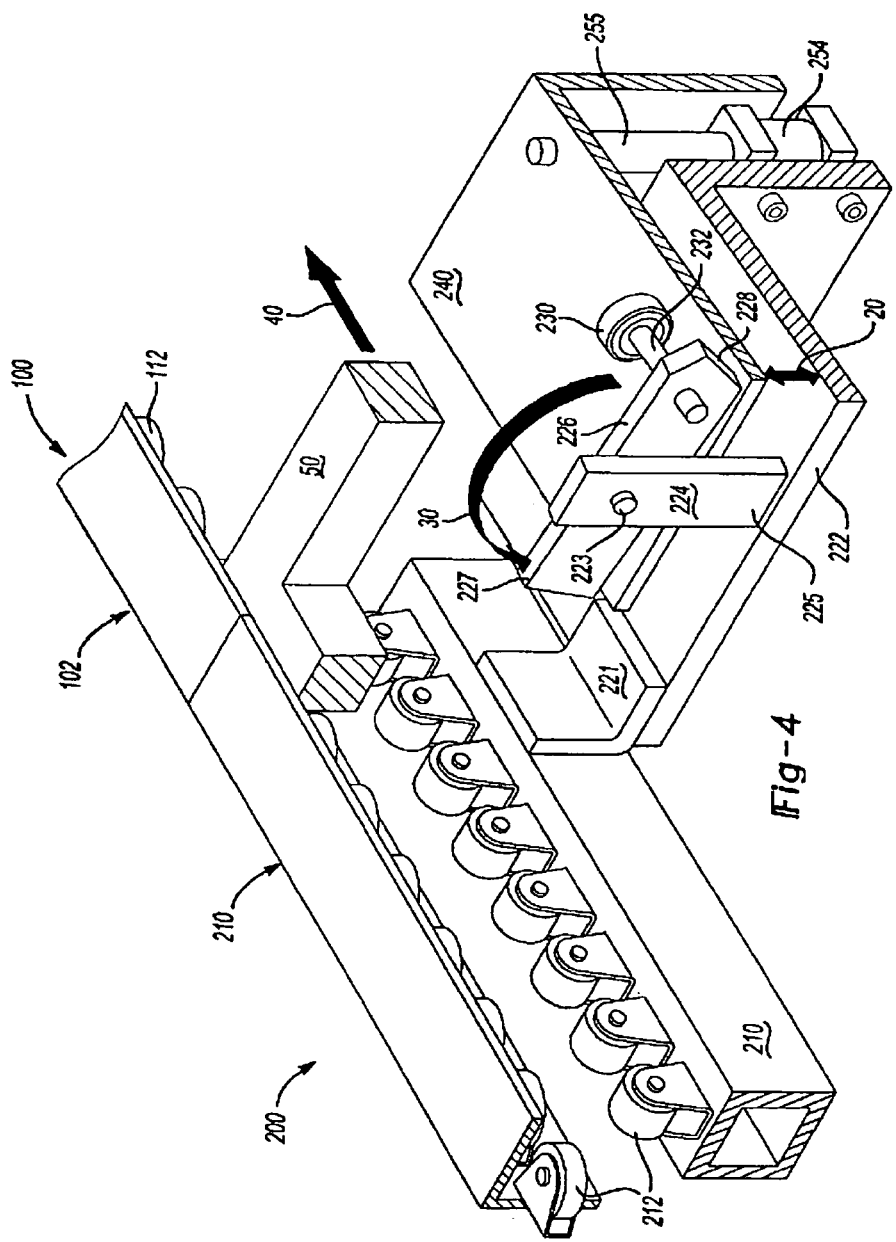
FIG. 4 is a perspective view of a component and/or component tray rolling past a stopper system according to an embodiment of the present invention and passing the first rack onto the dolly as illustrated in FIG. 1b.

Upon movement of the lift plate 240 in an upwardly direction, the plate 240 applies an upward force on the plate end 228 such that the stop end 227 pivots in a downward direction as shown by arrow 30 in FIG. 4. With the stop end 227 pivoted in a downward direction, the end 227 moves out of the way of the component 50 and thus allow it to pass thereby and move in a forward direction as indicated by arrow 40. In some instances, the plate end 228 can have a bearing 230 attached thereto, the beating 230 affording for a rolling movement between the lift plate 240 and the plate end 228 of the wiper bar 226. For example and for illustrative purposes only, a bearing shaft 232 extending from the wiper bar 226 can have the bearing 230 attached thereto. It is appreciated that the rolling movement between the bearing 230 and the lift plate 240 reduces friction therebetween and can afford for a generally smooth movement of the wiper bar 226.

In the event that the stopper system 220 is located on a fixed rack, that is a rack that has a fixed location, the lift plate 240 can be attached to the rack itself and activated when a trigger 108 (FIG. 2) attached to the load end 102 of the first rack 100 comes into contact with an actuator device 250 having feed lines 252 supplying air, hydraulic fluid, electricity, etc. to the cylinder and piston unit 254/255. In this manner, it is assured that the lift plate 240 is not activated until the load end 102 is adjacent to and aligned with the unload end 202. In addition, guide plates 104 can be attached to end posts 106 of the first rack 100 to assist in alignment of the load end 102 with the unload end 202. It is appreciated that once the wiper bar 226 is rotated into the pass position, one or more components 50 can pass from the second rack 200 onto the first rack 100 as illustrated in FIG. 1b.

Figure 5:
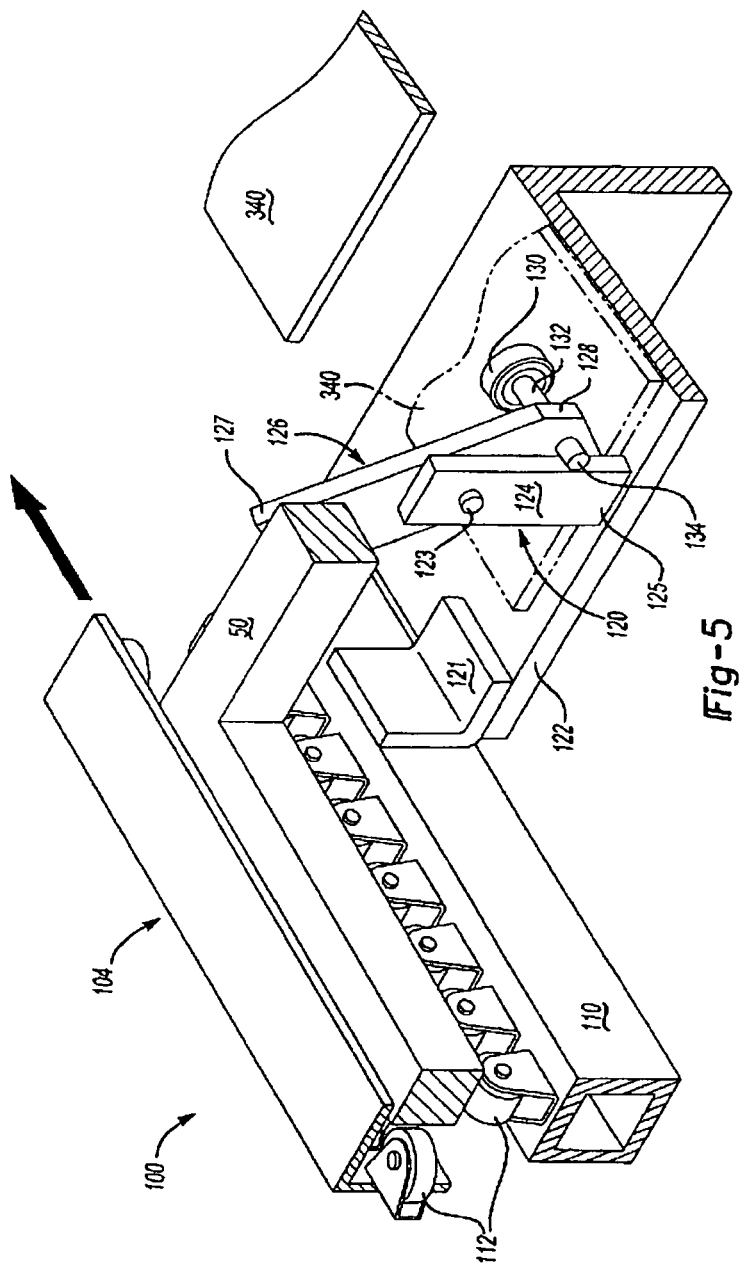
FIG. 5 is a perspective view of a component and/or a component tray being located up against a stopper system according to an embodiment of the present invention on the dolly as illustrated in FIG. 1c.

Turning now to FIG. 5, a rack stopper system 120 attached to the unload end 104 of the first rack 100 is shown. Such a system 120 is appreciated to prevent the plurality of components 50 from rolling off of the unload end 104 while the first rack 100 is moved from the second rack 200 to the third rack 300 as illustrated in FIG. 1c. The stopper system 120, being similar to the stopper system 220, includes a base 122 attached to a frame 110 of the first rack 100, a support bar 124 with a base end 125 rigidly attached to the base 122, and a wiper bar 126 pivotally attached to the support bar using a support pivot axis 123. It is appreciated that the first rack 100 can have a plurality of rollers 112 that afford for components 50 to roll thereon.

Figure 6:
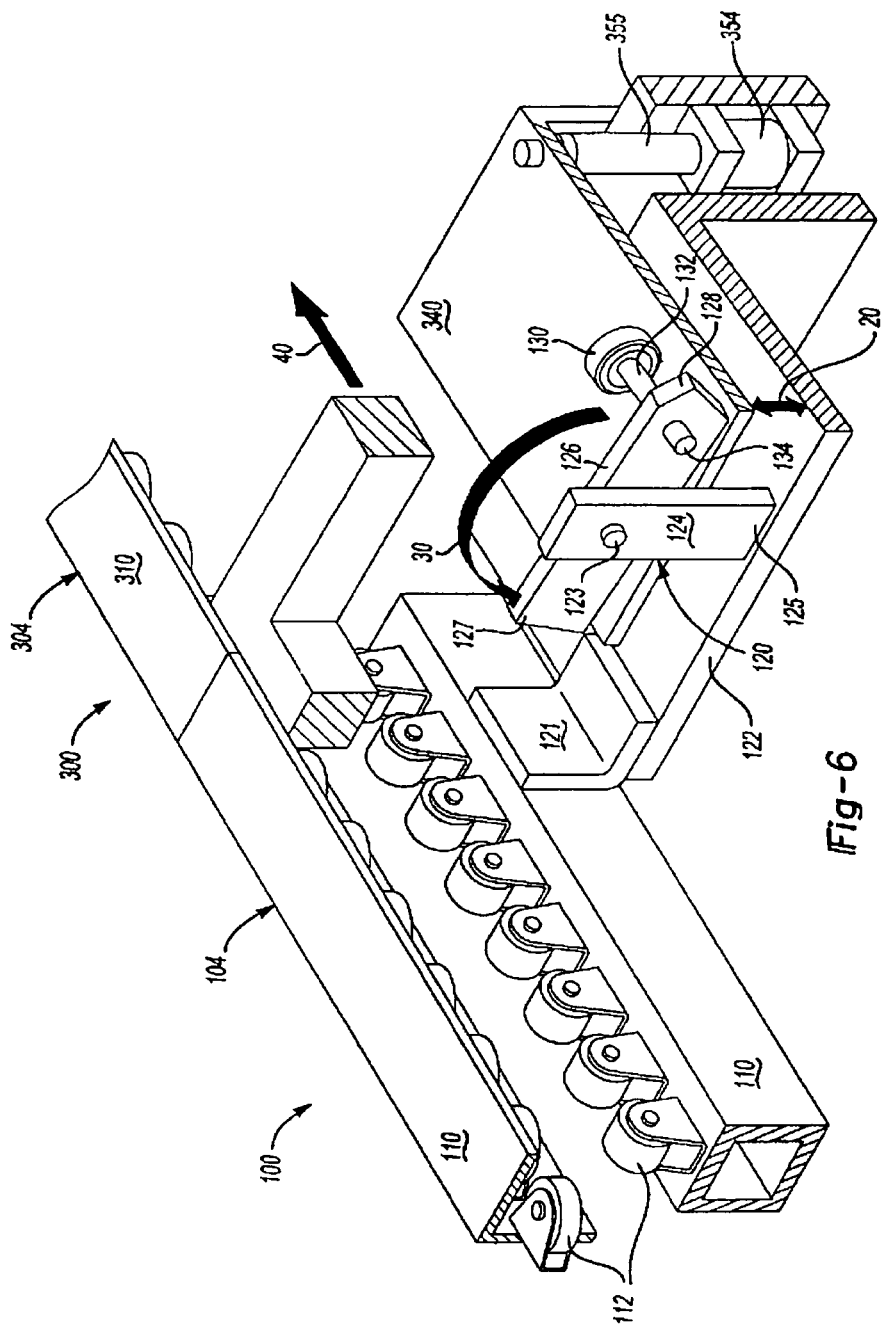
FIG. 6 is a perspective view of a component and/or component tray rolling past a stopper system according to an embodiment of the present invention and being transferred from the dolly to the second rack as illustrated in FIG. 1d.

As shown in FIG. 5, the wiper bar 126 is in a stop position with a stop end 127 preventing the component 50 from passing thereby. In addition, the wiper bar 126 has a plate end 128 that can be engaged by a lift plate 340. Given that the first rack 100 can be a dolly that can be rolled from a first location to a second location, it can be desirable that a lift plate mechanism not be included as part of the first rack 100. Therefore, the lift plate 340 can be attached to an unload end 304 of the third rack 300 as shown in FIG. 6. As such, the wiper bar 126 can be biased in the stop position and only when the unload end 104 is adjacent to and aligned with the load end 304 of the third rack 300 does the lift plate 340 engage the plate end 128 of the wiper bar 126. Furthermore, only at this time is the lift plate 340 activated from a down position to an up position as shown in FIG. 6, the activation affording for pivoting of the wiper bar 126 to the pass position as illustrated by the arrow 30. Once the wiper bar 126 has been pivoted to the pass position, the components 50 can pass thereby and be transferred from the second rack 100 to the third rack 300 as illustrated in FIGS. 1d and 6.

It is appreciated that the lift plate 340 can be activated in an identical manner as shown in FIG. 2 in which a trigger activates a lift plate mechanism only when the unload end 104 is adjacent to and aligned with the load end 304.

Naturally, the third rack 300 can also include a frame 310 with a plurality of rollers 312 that afford for the components 50 to roll thereon and thus be transferred and/or transported to a desired location. In addition, and as shown in FIG. 2, the stopper system 220 and /or stopper system 120 can include a pair of wiper bars such that redundant stopper system is provided. It is appreciated that with the use of a trigger such as 108 and a lift plate mechanism 250, a lift plate in combination with bearings and wiper bars provides a smooth transition of a stopper system from a stop position to a pass position. Such a smooth transition can result in the relatively smooth transfer of components from one rack to another rack.

The first rack, second rack, and components thereof can be made from any material known to those skilled in the art having desired properties for use as a base, a support bar, a wiper bar, and the like. For example and for illustrative purposes only, materials such as metals, alloys, ceramics, polymers, wood, etc. can be used for the various components. In addition, it is to be understood that various modifications are readily made to the embodiments of the present invention described herein without departing from the scope and spirit thereof. Accordingly, it is to be understood that the invention is not to be limited by the specific illustrated embodiments but by the scope of the appended claims.

We claim:

1. A rack stopper system for restricting the flow of components on a rack, said rack stopper system comprising:
a loading rack having:
   a loading rack unload end and a loading rack actuator device;
   a loading rack first support bar mounted to the loading rack unload end;
   a loading rack first wiper bar pivotally attached to the loading rack first support bar and pivotable between a stop position and a pass position, the loading rack first wiper bar having a plate end and a stop end;
   a loading rack first lift plate movable between an up position and a down position, the loading rack first lift plate engaged with the plate end of the loading rack first wiper bar;
a dolly operable to roll along a floor into alignment with the loading rack and having a dolly load end and a dolly trigger, the loading rack unload end being generally the same height as the dolly load end;
wherein:
the loading rack first lift plate engages the plate end of the loading rack first wiper bar such that when the loading rack first lift plate is in the down position the loading rack first wiper bar is in the stop position, and when the loading rack first lift plate is in the up position the loading rack first wiper bar is in the pass position, the loading rack first lift plate moving to the up position when the dolly trigger activates the loading rack actuator device, and the loading rack first lift plate moving to the down position when the dolly trigger moves away from the loading rack actuator device; and
the components are restricted from traveling from the loading rack to the dolly when the loading rack first wiper bar is in the stop position, and the components are free to travel from the loading rack to the dolly when the loading rack first wiper bar is in the pass position.

2. The rack stopper system of claim 1 wherein:
the dolly has:
a dolly unload end and a dolly second support bar mounted to the dolly unload end;

a dolly second wiper bar pivotally attached to the dolly second support bar and pivotable between a stop position and a pass position, the dolly second wiper bar having a plate end and a stop end;

and further comprising:
  an unloading rack having:
    an unloading rack load end, the unloading rack load end being generally the same height as the dolly unload end;
    an unloading rack second lift plate movably mounted to the unloading rack load end, the unloading rack second lift plate movable between an up position and a down position;
  wherein:
    the unloading rack second lift plate engages the plate end of the dolly second wiper bar such that when the unloading rack second lift plate is in the down position the dolly second wiper bar is in the stop position, and when the unloading rack second lift plate is in the up position the dolly second wiper bar is in the pass position; and
    the components are restricted from traveling from the dolly to the unloading rack when the dolly second wiper bar is in the stop position, and the components are free to travel from the dolly to the unloading rack when the dolly second wiper bar is in the pass position.

3. The rack stopper system of claim 2, wherein the loading rack actuation device is in communication with a piston cylinder unit, the piston cylinder unit moving the loading rack first lift plate between the up position and the down position.

4. The rack stopper system of claim 3 further comprising:
  a first bearing shaft mounted on the plate end of the loading rack first wiper bar and a second bearing shaft mounted on the plate end of the dolly second wiper bar
  a bearing rotatably mounted on to each bearing shaft;
  the loading rack first lift plate engaging the loading rack first wiper bar and the unloading rack second lift plate engaging the dolly second wiper bar by way of contact between the bearings and the loading rack first lift plate and the unloading rack second lift plate, respectively.

5. A rack stopper system for restricting the flow of components on a rack, said rack stopper system comprising:
  a loading rack having:
    a loading rack unload end and a loading rack actuator device;
    a loading rack first support bar mounted to the loading rack unload end;
    a loading rack first wiper bar pivotally attached to the loading rack first support bar and pivotable between a stop position and a pass position, the loading rack first wiper bar having a plate end and a stop end;
    a loading rack first lift plate movable between an up position and a down position, the loading rack first lift plate engaged with the plate end of the loading rack first wiper bar;
  a dolly operable to roll along a floor into alignment with the loading rack and having a dolly load end and a dolly trigger, the loading rack unload end being generally the same height as the dolly load end, the dolly comprising:
    a dolly unload end and a dolly second support bar mounted to the dolly unload end;
    a dolly second wiper bar pivotally attached to the dolly second support bar and pivotable between a stop position and a pass position, the dolly second wiper bar having a plate end and a stop end;
  an unloading rack comprising:
    an unloading rack load end, the unloading rack load end being generally the same height as the dolly unload end;
    an unloading rack second lift plate movably mounted to the unloading rack load end, the unloading rack second lift plate movable between an up position and a down position;
  wherein:
    the loading rack first lift plate engages the plate end of the loading rack first wiper bar such that when the loading rack first lift plate is in the down position the loading rack first wiper bar is in the stop position, and when the loading rack first lift plate is in the up position the loading rack first wiper bar is in the pass position, the loading rack first lift plate moving to the up position when the dolly trigger activates the loading rack actuator device, and the loading rack first lift plate moving to the down position when the dolly trigger moves away from the loading rack actuator device; and
    the components are restricted from traveling from the loading rack to the dolly when the loading rack first wiper bar is in the stop position, and the components are free to travel from the loading rack to the dolly when the loading rack first wiper bar is in the pass position.

6. The rack stopper system of claim 5, wherein the unloading rack second lift plate engages the plate end of the dolly second wiper bar such that when the unloading rack second lift plate is in the down position the dolly second wiper bar is in the stop position, and when the unloading rack second lift plate is in the up position the dolly second wiper bar is in the pass position; and
  the components are restricted from traveling from the dolly to the unloading rack when the dolly second wiper bar is in the stop position, and the components are free to travel from the dolly to the unloading rack when the dolly second wiper bar is in the pass position.

7. The rack stopper system of claim 6, wherein the loading rack actuation device is in communication with a piston cylinder unit, the piston cylinder unit moving the loading rack first lift plate between the up position and the down position.

8. The rack stopper system of claim 7 further comprising:
  a first bearing shaft mounted on the plate end of the loading rack first wiper bar and a second bearing shaft mounted on the plate end of the dolly second wiper bar
  a bearing rotatably mounted on to each bearing shaft;
  the loading rack first lift plate engaging the loading rack first wiper bar and the unloading rack second lift plate engaging the dolly second wiper bar by way of contact between the bearings and the loading rack first lift plate and the unloading rack second lift plate, respectively.

* * * * *